US006226058B1

United States Patent
Ohi

(10) Patent No.: US 6,226,058 B1
(45) Date of Patent: May 1, 2001

(54) ACTIVE MATRIX LIQUID CRYSTAL DISPLAY UNIT HAVING PIXEL ACCOMPANIED WITH ACCUMULATING CAPACITOR VARIED IN WIDTH ALONG GATE LINE

(75) Inventor: Susumu Ohi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/604,017

(22) Filed: Jun. 26, 2000

Related U.S. Application Data

(62) Division of application No. 08/866,277, filed on May 30, 1997, now Pat. No. 6,115,087.

(51) Int. Cl.⁷ .................. G02F 1/136; G02F 1/1337; G02F 1/1343
(52) U.S. Cl. .............. 349/38; 349/128; 349/136
(58) Field of Search .................. 349/38, 39, 42, 349/43, 128, 129, 136; 345/90, 92

(56) References Cited

U.S. PATENT DOCUMENTS 5,781,262   7/1998   Suzuki et al. .................. 349/128

FOREIGN PATENT DOCUMENTS 52-21845   8/1975   (JP) .
4-51121    2/1992   (JP) .
6-273802   9/1994   (JP) .

OTHER PUBLICATIONS

K. Takatori et al., "A Complementary TN LCD with Wide-Viewing-Angle Grayscale", *Japan Display* '92, pp. 591–594. No Date.

*Primary Examiner*—Kenneth Parker
*Assistant Examiner*—Tai V. Duong
(74) *Attorney, Agent, or Firm*—Sughrue, Mion, Zinn, Macpeak & Seas, PLLC

(57) ABSTRACT

A pixel electrode and a counter electrode of an active matrix liquid crystal display unit are respectively covered with orientation layers differently rubbed, one end portion of the pixel electrode forms an accumulating capacitor together with a gate line and a gate insulating layer inserted therebetween, and the one end portion is varied in width along the gate line so as to confine a disclination line into the liquid crystal over the gate line.

4 Claims, 18 Drawing Sheets

US 6,226,058 B1

ACTIVE MATRIX LIQUID CRYSTAL DISPLAY UNIT HAVING PIXEL ACCOMPANIED WITH ACCUMULATING CAPACITOR VARIED IN WIDTH ALONG GATE LINE

This is a divisional of application Ser. No. 08/866,277 filed May 30, 1997, now U.S. Pat. No. 6,115,087, the disclosure of which is incorporated herein by reference.

FIELD OF THE INVENTION

This invention relates to a liquid crystal display unit and, more particularly, to an active matrix liquid crystal display unit having pixel accompanied with an accumulating capacitor varied in width along a gate line.

DESCRIPTION OF THE RELATED ART

The liquid crystal display unit is so compact and has low-power consumption that there is a great demand for the liquid crystal display unit. Research and development efforts have been made for the liquid crystal display unit with an emphasis on a high-resolution sharp-gradation wide-screen liquid crystal display panel. However, the manufacturer encounters various technical problems. When the pixels become smaller, the distance between signal wiring and pixel electrode gets narrower and narrower, and the narrow distance makes the lateral electric field strong around the pixel electrode. The strong electric field undesirably affect the orientation of the liquid crystal. A multi-domain type liquid crystal display unit has a plurality of stable orientations in the pixel, and is expected to achieve a wide view angle. The pixels of the multi-domain type liquid crystal display unit are also getting smaller and smaller, and the unstable orientation caused by the lateral field, again, becomes conspicuous.

An active matrix liquid crystal display unit is equipped with thin film transistors arranged in a matrix, and the thin film transistors selectively address image signals to the pixels. The active matrix type liquid crystal display unit achieves a large contrast ratio, a wide view angle and a quick response in comparison to a simple matrix type liquid crystal display unit, and provides a more attractive display.

In the active matrix liquid crystal display unit, the thin film transistors are connected between data lines and pixel electrodes, and gate lines are selectively connected to the gate electrodes of the thin film transistors. A counter electrode is opposed to the pixel electrodes, and liquid crystal fills the gap between the counter electrode and the pixel electrodes. For this reason, a liquid crystal capacitor is coupled to each of the thin film transistor, and an accumulating capacitor is usually added to each pixel. Each of the pixel electrodes, a part of the counter electrode opposed thereto and a piece of liquid crystal therebetween form a pixel, and pixels form a screen where an image is reproduced.

The gate lines are sequentially changed to an active level, and the active level causes the thin film transistors to sequentially turn on. Image signals representative of variation of luminance on each line of pixels are supplied to the data lines in synchronism with the addressing, and the thin film transistors transfer the image signals from the data lines to the line of pixel electrodes. The image signals differently bias the pixel electrodes with respect to the counter electrode, and are accumulated in the pixels until the next selection. The liquid crystal changes its orientations depending upon the magnitude of the image signals, and reproduce a part of an image represented by the image signals. The pixels of each line store the image signals during a time period called a "frame", i.e., time period from the previous selection to the present selection. In this way, the image signals are sequentially addressed to the lines of pixels, and the image is reproduced on the screen.

The accumulating capacitance prevents the associated pixel from undesirable change of gradation due to leakage current during the frame, and decreases the feed-through or undesirable potential variation on the pixel electrode due to the parasitic capacitance between the gate electrode and the source node of the associated thin film transistor at the turn-off. The amount of feed-through is varied with the gradation, because the liquid crystal has the dielectric constant anisotropically variable in dependence on the orientation thereof. If the feed-through is too large, dc voltage is applied to the liquid crystal, and the liquid crystal is damaged. Thus, the accumulating capacitor is an important component of the active matrix liquid crystal display unit.

FIG. 1 illustrates a typical example of the pixel associated with a common-storage type accumulating capacitor. As described hereinbefore, a thin film transistor TFT1 is connected between a data line DL1 and a liquid crystal capacitor CP1, and a gate line ADD1 is connected to the gate electrode of the thin film transistor TFT1. An accumulating capacitor CP2 is connected in parallel to the liquid crystal capacitor CP1.

FIGS. 2 and 3 illustrate the prior art pixel and the common-storage type accumulating capacitor CP2. The gate line ADD1 and an adjacent gate line ADD2 extend in parallel, and a conductive line CL1 is provided between the gate lines ADD1 and ADD2. The gate lines ADD1/ADD2 and the conductive line CL1 are covered with a gate insulating layer 1a, and a pixel electrode 1b is formed on the gate insulating layer 1a in such a manner as to be overlapped with the pixel electrode 1b. The data line DL1 and an adjacent data line DL2 extend on the gate insulating layer 1a. Source and drain regions 2a/2b of the thin film transistor TFT1 project from the pixel electrode 1b and the data line DL1 (see FIG. 2), and a gate electrode 2c projects from the gate line ADD1. The source and drain regions 2a/2b, the gate insulating layer 1a and the gate electrode 2c as a whole constitute the thin film transistor TFT1. In FIG. 2, the gate insulating layer 1a is removed, and the conductive line CL1 is indicated by hatching lines for clearly understanding the layout.

The conductive line CL1, the gate insulating layer 1a and a part of the pixel electrode 1b form in combination the accumulating capacitor CP2, and a low potential level equal to that of the counter electrode 1c is applied to the conductive line CL1. The conductive line CL1 is on the same level as the gate lines ADD1/ADD2, and is concurrently patterned together with the gate lines ADD1/ADD2. However, the conductive line CL1 does not allow light to pass therethrough, and the prior art pixel encounters a problem in darkness of the pixel.

FIGS. 4, 5 and 6 illustrate a typical example of the liquid crystal pixel. Firstly, the equivalent circuit of the prior art pixel is described with reference to FIG. 4. A gate line ADD3 and a data line DL3 are associated with a thin film transistor TFT2, and an adjacent gate line and an adjacent data line are labeled with ADD4 and DL4, respectively. The gate line ADD3 is connected to a gate electrode 2a of the thin film transistor TFT2, and the data line DL3 and a liquid crystal capacitor CP3 are connected to source and drain regions 2b and 2c of the thin film transistor TFT2. The liquid crystal capacitor CP3 is associated with an accumulating capacitor CP4, and the accumulating capacitor CP4 is connected between the source region 2b and the adjacent gate line ADD4.

As shown in FIG. 5 of the drawings, one of the corners of the pixel electrode 3a is cut away so as to provide a vacant area for the thin film transistor TFT2, and has a projection 3b. The gate lines ADD3/ADD4 are placed under the data lines DL3/DL4 and the pixel electrode 3a, and a part of the gate line ADD4 is overlapped with the projection 3b. The gate lines ADD3/ADD4 are covered with a gate insulating layer 3c, and the pixel electrode 3a is opposed through the gate insulating layer 3c to the projection 3b and a counter electrode 3d as shown in FIG. 6.

Thus, any conductive line CL1 is not required for the prior art pixel electrode disclosed in Japanese Patent Publication of Unexamined Application No. 59-16685, and the pixel is improved in brightness.

A twisted nematic liquid crystal display unit has a a substrate for the thin film transistors covered with an orientation film and another substrate for color filters also covered with an orientation film, and liquid crystal fills the gap between the orientation films. The orientation films are usually formed of polyimide, and the surfaces of the orientation films are rubbed by using a roller coated with rayon cloth. The rubbing directions of the orientation films are twisted at about 90 degrees, and the liquid crystal molecules are also directed in the boundary areas between the orientation films and the liquid crystal layer at about 90 degrees. A certain angle between the axis of the liquid crystal molecule and the rubbing direction is called as "pre-tilt angle".

While no potential is applied across the liquid crystal layer, the liquid crystal molecules are lying and are twistedly oriented. However, when electric field is applied across the liquid crystal layer, the liquid crystal molecules rise, and the axes of the liquid crystal molecules are directed at the pre-tilt in the region mainly dominated by the vertical electric field between the pixel electrode and the counter electrode. In other words, the orientation films on both substrates are usually rubbed in such a manner as to have the rubbing direction and the direction of twisting motion making the rising direction matched with the pre-tilt angle.

FIGS. 7 and 8 illustrate a typical example of the pixel of the twisted nematic liquid crystal display unit. A bottom substrate 4a and a top substrate 4b are spaced from each other, and liquid crystal fills the gap between the bottom substrate 4a and the top substrate 4b. Address lines 4d and a pixel electrode 4e are patterned on the bottom substrate 4a, and a counter electrode 4f is formed on the top substrate 4b. Arrows RB1 and RB2 are indicative of the rubbing direction over the bottom substrate 4a and the rubbing direction over the top substrate 4b, respectively, and the pre-tilt angle is represented by AG1. The rubbing directions RB1/RB2 causes the left-handed twisted nematic liquid crystal molecules to rise toward the pre-tilting direction, because the liquid crystal molecules in the central zone of the pixel electrode 4e are not affected by the lateral electric field.

However, the influence of the lateral electric field becomes strong in the end zones of the pixel electrode 4e. The liquid crystal molecules rise in the same direction as those in the central zone over the rubbing lines on the bottom substrate 4a, because the pre-tilting direction is matched with the rising direction of the liquid crystal molecules under the lateral electric field. This is because of the fact that the liquid crystal molecules have the anisotropic dielectric constant. As a result, undesirable reverse tilt does not take place. However, in the end zone where the rubbing direction is opposite, the rising direction of the liquid crystal molecules is opposite to the pre-tilt direction due to the lateral electric field, and the liquid crystal molecules rise in a different direction from those in the central zone. This results in the reverse tilt. Then, a disclination line 4g takes place along the boundary between the reverse tilt region and the non-reverse tilt region. The disclination line 4g is formed by the lying liquid crystal molecules, and is recognized as a bright line. For this reason, the disclination line 4g causes a reduction of contrast. The disclination line 4g is moved by varying the potential of the pixel electrode 4e. When the disclination line enters into the image-forming area, the disclination line causes an after-image or a burn, and deteriorates image-producing characteristics of the liquid crystal display unit. When the pixel size is decreased, the influence of the lateral electric field gets larger and larger.

The overlap between the gate line and the pixel electrode relaxes the influence of the lateral electric field. However, the accumulating capacitance is increased together with the overlapped area, and the increased accumulating capacitance becomes an obstacle against an image to be quickly moved.

A countermeasure against the disclination line is proposed in Japanese Patent Publication of Unexamined Application No. 4-51121, and FIGS. 9 to 11 illustrate the prior art pixel disclosed in the Japanese Patent Publication of Unexamined Application. The prior art pixel includes a pixel electrode 5a, a thin film transistor TFT3, a gate line ADD5 connected to the gate electrode 6a of the thin film transistor TFT3 and a data line DL5 connectable through the thin film transistor TFT3 to the pixel electrode 5a. The gate line ADD5 and another gate line ADD6 are covered with a gate insulating layer 6b, and the pixel electrode 5a is formed on the gate insulating layer 6b. The pixel electrode 5a is covered with a dielectric layer 5b, and liquid crystal fills the gap between the dielectric layer 5b and a counter electrode 5d. The pixel electrode 5a, the liquid crystal 5c and the counter electrode 5d as a whole constitute a liquid crystal capacitor CP5.

A capacitor electrode line 5e is formed on the dielectric layer 5b, and is shaped in a frame-like configuration (see FIG. 10). The gate insulating layer 6b and the dielectric layer 5b are deleted from FIG. 10, and the capacitor electrode line 5e is hatched so as to clearly discriminate it from the other lines and electrode.

The outer peripheral area of the pixel electrode line 5a is overlapped with the inner peripheral area of the capacitor electrode line 5e, and the inner peripheral area of the capacitor electrode line 5e, the dielectric layer 5b and the out peripheral area of the pixel electrode 5a form in combination an accumulating electrode CP6. The counter electrode 5d and the capacitor electrode line 5e are commonly connected to a bias source. The capacitor electrode line 5e restricts the lateral electric field. However, the capacitor electrode line 5e requires a deposition step, photo-lithographic steps and an etching step, and the process sequence is made complicated. This results in that the production cost is increased.

A multi-domain liquid crystal pixel achieves a wide viewing angle. A typical example of the multi-domain liquid crystal pixel is disclosed in Japanese Patent Publication of Unexamined Application No. 52-21845. FIGS. 12, 13A and 13B illustrate a prior art multi-domain liquid crystal pixel. Gate lines ADD6/ADD7 extend in perpendicular to data lines DL6/DL7, and a gate insulating layer 7a is inserted between the gate lines ADD6/ADD7 and the data lines DL6/DL7. A pixel electrode 8a is formed on the gate insulating layer 7a between the data lines DL6 and DL7, and a part of the gate line ADD6 is overlapped with the pixel electrode 8a. A thin film transistor TFT4 is connected between the data line DL6 and the pixel electrode 8a as similar to the prior art pixels described hereinbefore.

The orientation lines are differently directed on both sides of a boundary plane 8b, and domains on both sides of the boundary plane 8b are referred to domain "A" and domain "B", respectively. The bottom substrate for the thin film transistors TFT4 are rubbed in direction AR10 for domain "A" and in direction AR11 for domain "B", and the top substrate for the counter electrode is rubbed in direction AR12 for domain "A" and in direction AR13 for domain "B".

When an electric field is applied between the pixel electrode 8a and the counter electrode, the liquid crystal molecules in domain "A" and domain "" differently rise as shown in FIGS. 13A and 13B, respectively, and the visual field is drastically improved. K. Takatori et. al. proposes how to realize the divided domains in the paper entitled as "A Complementary TN LCD with Wide-Viewing-Angle Grayscale". JAPAN DISPLAY '92-591. According to the paper, a high-pre-tilt orientation film is formed on a bottom substrate 9a for thin film transistors, and a low-pre-tilt orientation film is formed on a top substrate 9b for color filters. A pixel electrode 9c and a counter electrode 9d are formed on the bottom substrate 9a and the top substrate 9b, respectively, and liquid crystal fills the gap between the bottom substrate 9a and the top substrate 9b. Rubbing lines are differently oriented in two domains "A" and "B", and the rubbing lines on the bottom substrate 9a determine the tilting directions of the liquid crystal molecules.

If the rubbing lines are directed as shown in FIG. 12, the tilting directions of the liquid crystal molecules 9f in the domain "" are matched with the rubbing directions around both substrates 9a/9b, and the liquid crystal molecules rise as shown in FIG. 13B. For this reason, a disclination line is liable to take place in the upper portion of the left side in domain "B". On the other hand, although the rubbing lines on the bottom substrate 9a in domain "A" are matched with the tilting direction, the rubbing lines on the top substrate 9b are different from the tilting direction, and the liquid crystal molecules around the top substrate 9b are a spray orientation. The liquid crystal molecules in the spray orientation are subjected to large volumetric strain, and are unstable in energy state. In domain "A", liquid crystal molecules in the spray orientation are encircled by dots-and-dash line DD1. As a result, the reverse-tilt and reverse-twist are liable to take place. The reverse tilt tends to take place in the lower portion of the right side in domain "A", because the rubbing lines are different from the tilting direction of the liquid crystal molecules due to the lateral electric field. Although the upper portion on the right side of domain "A" is ordinarily oriented and stable, the reverse tilt is liable to take place due to the lateral electric field.

Various prior art liquid crystal pixels are described hereinbefore. The multi-domain liquid crystal pixel is effective against the penetration of the disclination line into an image-forming area. However, the prior art multi-domain liquid crystal display unit still requires a fairly wide black matrix for shielding the disclination line. The wide black matrix decreases the ratio of the image-forming area, and deteriorates the brightness of the pixel. A strong back-light compensates the brightness. However, the strong back-light increases the consumption of electric power.

SUMMARY OF THE INVENTION

It is therefore an important object of the present invention to provide a liquid crystal display unit which has a bright screen, a wide viewing angle and a low electric power consumption.

The present inventor contemplated the problem, and noticed that, when the pre-tilt angle over the bottom substrate became larger, the liquid crystal molecules were not liable to be affected by the lateral electric field, and a disclination line due to the difference between the tilting direction and the rising direction under the application of electric field hardly entered into the liquid crystal molecules. The present inventor carried out a two-dimensional liquid crystal simulation, and FIG. 14 illustrated a penetration of a disclination line in terms of pre-tilt angle. In the simulation, the orientation of the liquid crystal molecules were calculated on the basis of the distribution of electric field in the liquid crystal. Plots PL1, PL2 and PL3 were indicative of the lengths PL1, PL2 and PL3 in FIGS. 8 and 12. If the pre-tilt angle was increased from 3 degrees to 7 degrees, the penetration of the disclination line was decreased from 6 microns to 3.5 microns. Moreover, if the liquid crystal molecules are in the spray orientation, the penetration was increased from 3.5 microns to 5 microns under the same pre-tilt angle of 7 degrees.

Plots PL1 and PL2 taught the present inventor that the disclination line was curved along the end line of the pixel electrode. The present inventor investigated the prior art liquid crystal pixels, and noticed that the gate line and the pixel electrode of the gate storage capacitor were constantly overlapped with each other. The present inventor Concluded that if the end line was curved, the disclination line remained over the gate line.

In accordance with the present invention, there is provided an active matrix liquid crystal display unit comprising: a first substrate structure including at least two non-transparent gate lines spaced from each other, an insulating layer covering the at least two gate lines, at least one data line electrically isolated from the at least two gate lines, a transparent pixel electrode electrically isolated from the at least two gate lines by means of the insulating layer, connectable to the at least one data line, and having an end portion forming an accumulating capacitor together with the insulating layer and a part of one of the at least two gate lines, the end portion having a width varied along the aforementioned one of the at least two gate lines, a switching transistor connected between the at least one data line and the transparent pixel electrode and gated by the other of the at least two gate lines, and a first transparent orientation layer covering at least the transparent pixel electrode and having first rubbing lines directed to a first direction; a second substrate structure including a transparent counter electrode opposed to the transparent pixel electrode, and a second transparent orientation layer covering at least the counter electrode and having second rubbing lines directed to a second direction different to the first direction; and a liquid crystal layer filling a gap between the first substrate structure and the second substrate structure.

BRIEF DESCRIPTION OF THE DRAWINGS

The features and advantages of the active matrix liquid crystal display unit according to the present invention will be more clearly understood from the following description taken in conjunction with the accompanying drawings in which.

DESCRIPTION OF THE PREFERRED EMBODIMENTS

First Embodiment

Figure 15:
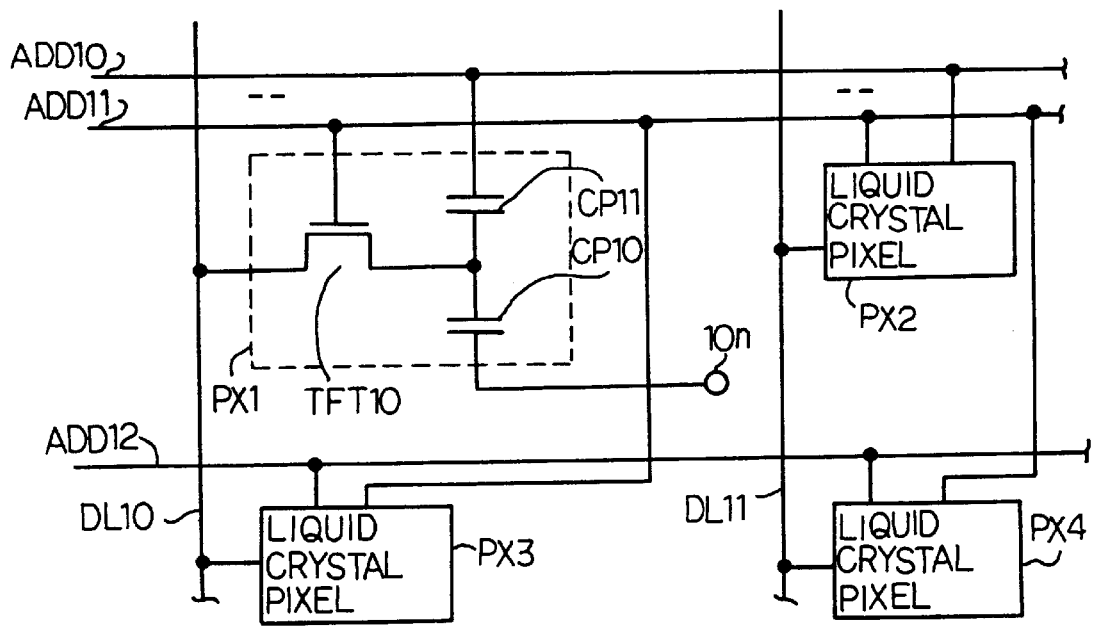
FIG. 15 is a circuit diagram showing an equivalent circuit of a liquid crystal pixel according to the present invention.

FIG. 15 illustrates the equivalent circuit of a liquid crystal pixel PX1 forming a part of a liquid crystal display unit embodying the present invention together with other liquid crystal pixels PX2/PX3/PX4. Gate lines ADD10/ADD11/ADD12 are respectively associated with rows of the liquid crystal pixels PX1–PX2/PX3–PX4, and data lines DL10/DL11 selectively transfer image signals representative of a part of visual image to be produced to columns of liquid crystal pixels PX1–PX3/PX2–PX4. The pixels PX1 to PX4 form a screen where the visual image is produced.

The liquid crystal pixel PX1 comprises a liquid crystal capacitor CP10, an accumulating capacitor CP11 and a thin film transistor TFT10. The thin film transistor TFT10 is gated by the gate line ADD11, and transfers the image signal to the liquid crystal capacitor CP10 and the accumulating capacitor CP11.

Figure 17:
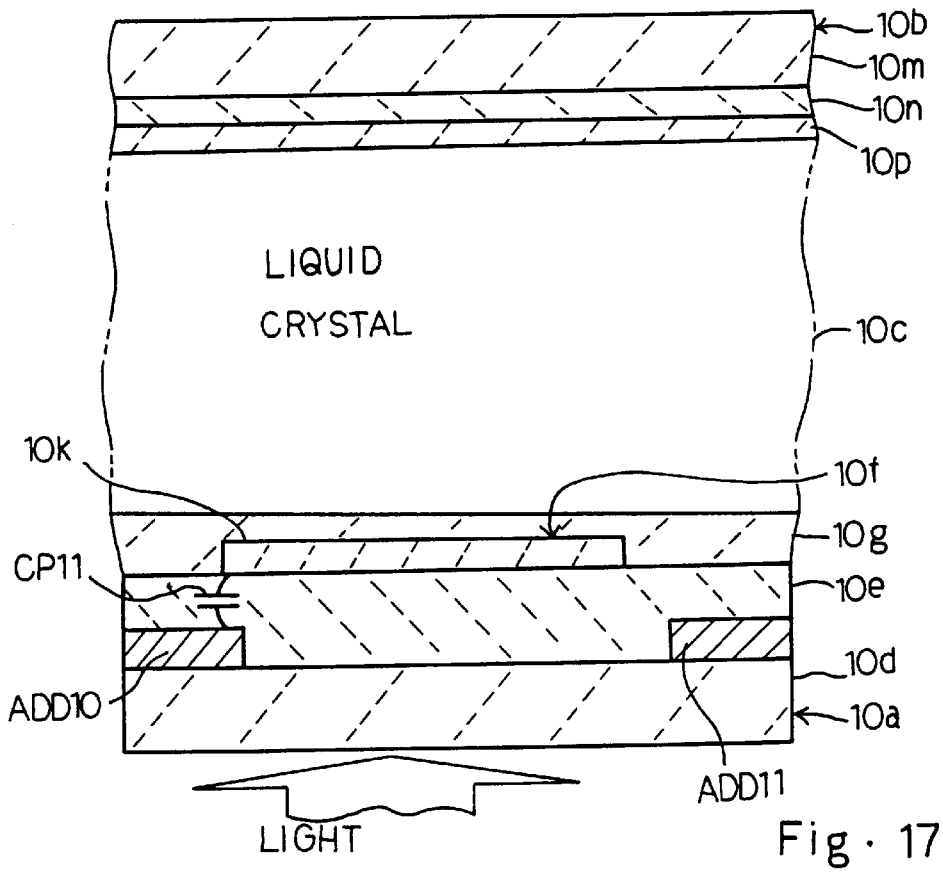
FIG. 17 is a cross sectional view taken along line IV—IV of FIG. 16 and showing the structure of the liquid crystal pixel.
Figure 16:
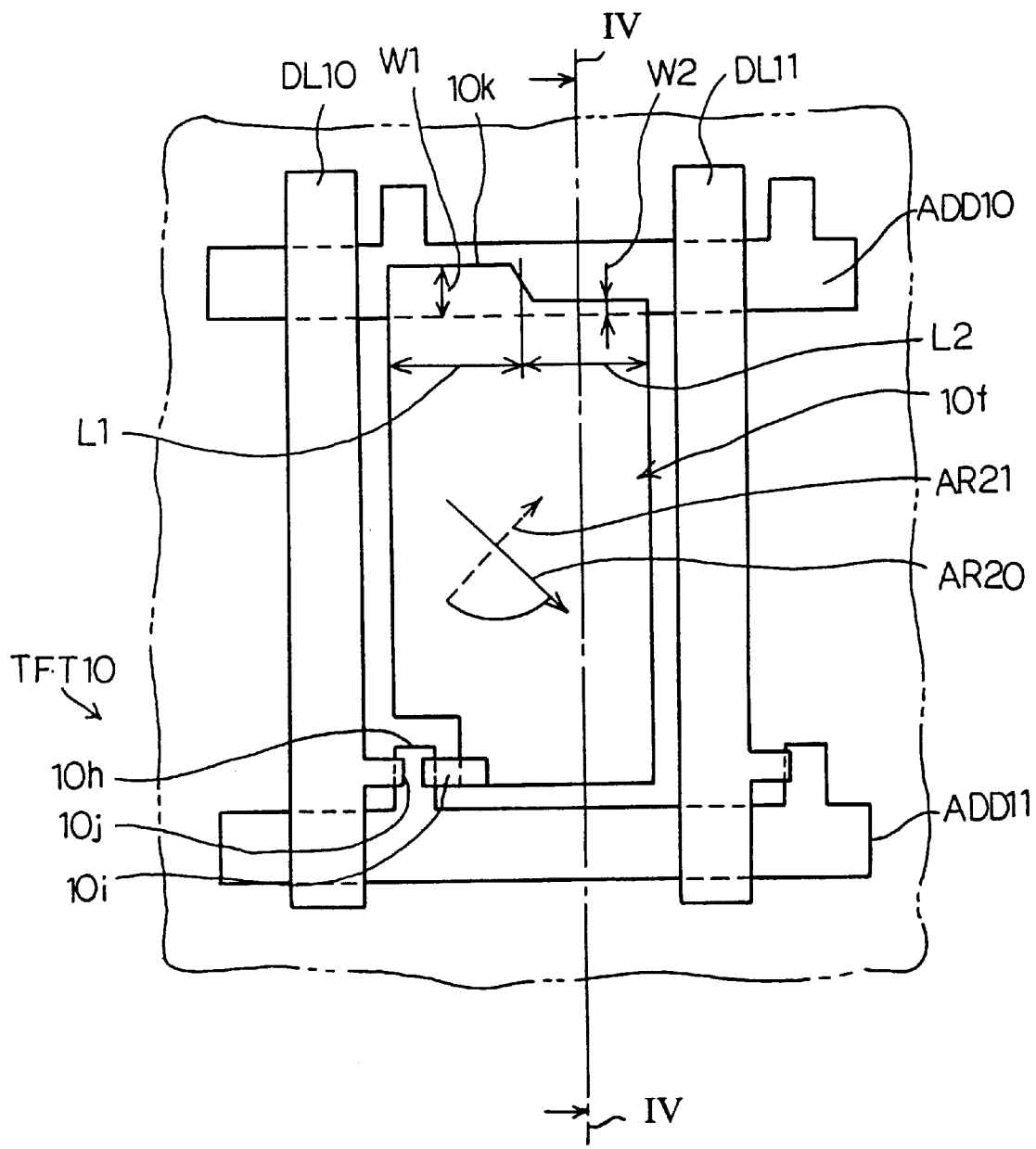
FIG. 16 is a plan view showing the layout of the liquid crystal pixel.

As shown in FIGS. 16 and 17, the pixel PX1 includes a bottom substrate structure 10a, a top substrate structure 10b spaced from the bottom substrate structure 10a and liquid crystal 10c filling the gap between the bottom substrate structure 10a and the top substrate structure 10b. Only the gate lines ADD10–ADD11, the data lines DL10/DL11 and a conductive electrode are shown in FIG. 16 so as to clearly show the relative position therebetween.

The bottom substrate structure 10a has a bottom transparent insulating substrate 10d, gate lines ADD10, ADD11 and ADD12 patterned on the bottom transparent insulating substrate 10d, a transparent gate insulating layer 10e covering the gate lines ADD10–ADD12, a transparent pixel electrode patterned on the transparent gate insulating layer 10e, data lines DL10/DL11 also patterned on the transparent gate insulating layer 10e and an orientation film 10g covering the pixel electrode 10k and the data lines DL10/DL11.

The gate line ADD11 has a projection serving as a gate electrode 10h of the thin film transistor TFT10, and source and drain regions 10i and 10j are connected to the data line DL10 and the pixel electrode 10f, respectively. The pixel electrode 10f is provided between the adjacent two data lines DL10 and DL11, and a part of the gate line ADD10 is overlapped with an end portion 10k of the pixel electrode 10f. The end portion has a wide sub-portion and a narrow sub-portion. The wide sub-portion and the narrow sub-portion have widths W1 and W2 and lengths L1 and L2, and the width W1 is greater than the width W2. The width W1 is illustrated by example as a distance from a first sub-end line of the top edge of the pixel electrode and a virtual line indicated by the dotted line in FIG. 16. Similarly, the width W2 is illustrated by example as a distance from a second sub-end line of the top edge of the pixel electrode and the virtual line. A connecting portion is disposed between the narrow and side portions, having a varying width. The pixel electrode further includes first and second longitudinal sidelines that partially overlap the gate line ADD10. An opposite end of the pixel electrode is disposed proximate to the non-overlapping gate line ADD 11. Thus, the end portion is not constant in width, and changes the overlapped area between the gate line ADD10 and the transparent pixel electrode 10f along the gate line ADD10. The orientation film 10g is rubbed in a direction indicated by an arrow AR20 as a virtual oblique line drawn from a corner defined by the virtual line and a first longitudinal edge of the pixel electrode towards a second corner defined by the second longitudinal edge of the pixel electrode and an edge of the pixel electrode disposed near gate line ADD11. The transparent insulating substrate 10d, the transparent gate insulating layer 10e and the orientation film 10g are shared between the liquid crystal pixels PX1 to PX4, and the top substrate structure 10b and the liquid crystal 10c are also shared therebetween.

Figure 14:
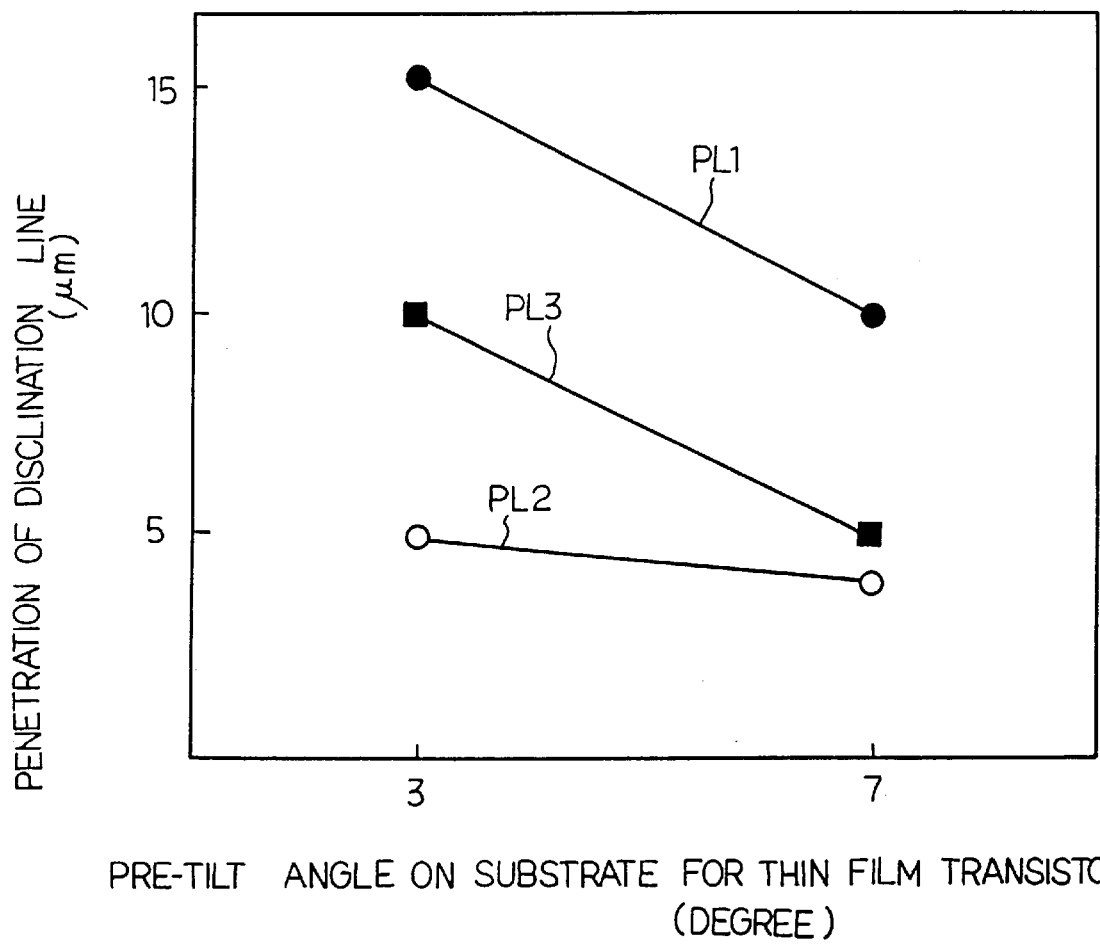
FIG. 14 is a graph showing the relation between the pre-tilt angle and the penetration of disclination line.

The pre-tilt angle of the liquid crystal molecules in the vicinity of the bottom substrate structure is regulated to 3 degrees, and width W1 and width W2 are determined to be equal to or greater than 15 microns and 5 microns on the basis of the relation shown in FIG. 14, respectively. If the pre-tilt angle is increased to 7 degrees, which is the maximum pre-tilt angle presently practically achieved, width W1 is decreased to 10 microns, and width W2 is decreased to 4 microns. Of course, if the pre-tilt angle exceeds over 7 degrees, the widths W1 and W2 are further decreased. The lengths L1 and L2 are determined in such a manner that the overlapped area, i.e., L1×W1+L2×W2 produces a predetermined accumulating capacitance which is at least a half of the capacitance of the liquid crystal capacitor CP10.

The top substrate structure 10b includes a transparent insulating substrate 10m defining the gap together with the transparent insulating substrate 10d and spacers (not shown), a transparent counter electrode 10n formed on the transparent insulating substrate 10m and an orientation film 10p covering the counter electrode 10n. The orientation film 10p is rubbed in a direction indicated by arrow AR21.

The transparent pixel electrode 10f, the counter electrode 10n and the liquid crystal 10c form in combination the liquid crystal capacitor CP10, and the end portion 10k, the transparent gate insulating layer 10e and the part of the gate line ADD10 form the accumulating capacitor CP11.

When the gate line ADD10 is changed to an active level, the thin film transistors TFT10 of the pixels PX1/PX2 turn on, and the image signals are transferred from the data lines DL1/DL2 to the liquid crystal capacitors CP10 and the accumulating capacitors CP11. The liquid crystal molecules rise depending upon the gradations represented by the image signals, and the pixels PX1/PX2 allow the back-light to pass therethrough so as to form a piece of visual image on the screen.

Figure 1:
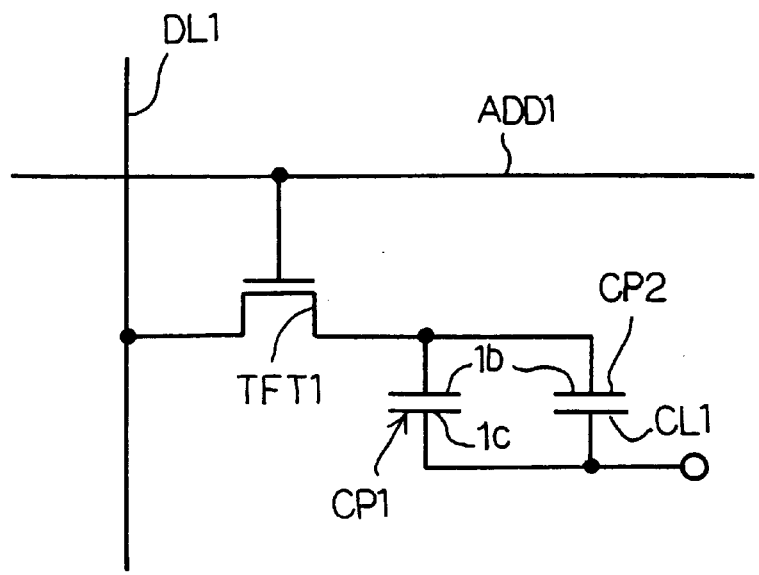
FIG. 1 is a circuit diagram showing the equivalent circuit of the prior art pixel.
Figure 3:
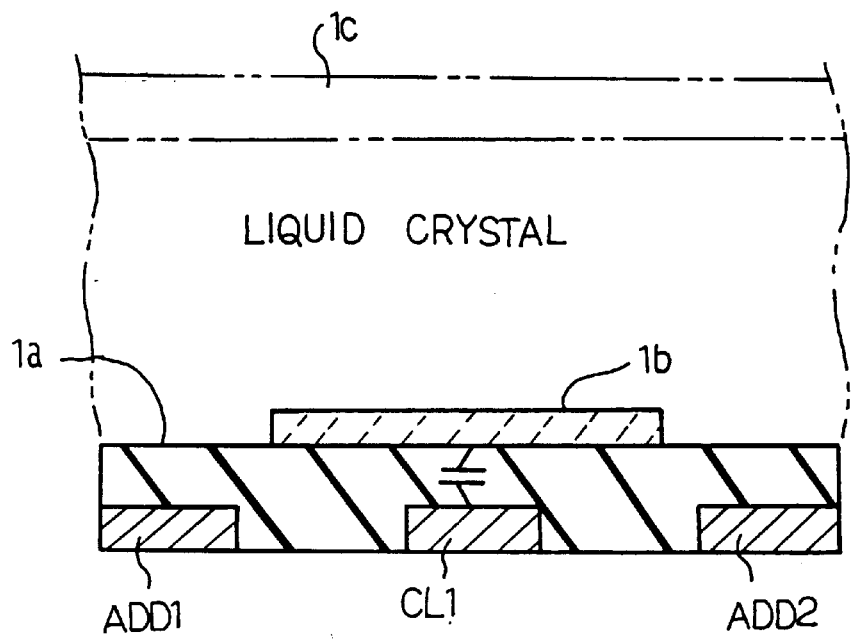
FIG. 3 is a cross sectional view taken along line I—I and showing the structure of the thin film transistor and the pixel electrode incorporated in the prior art pixel.
Figure 2:
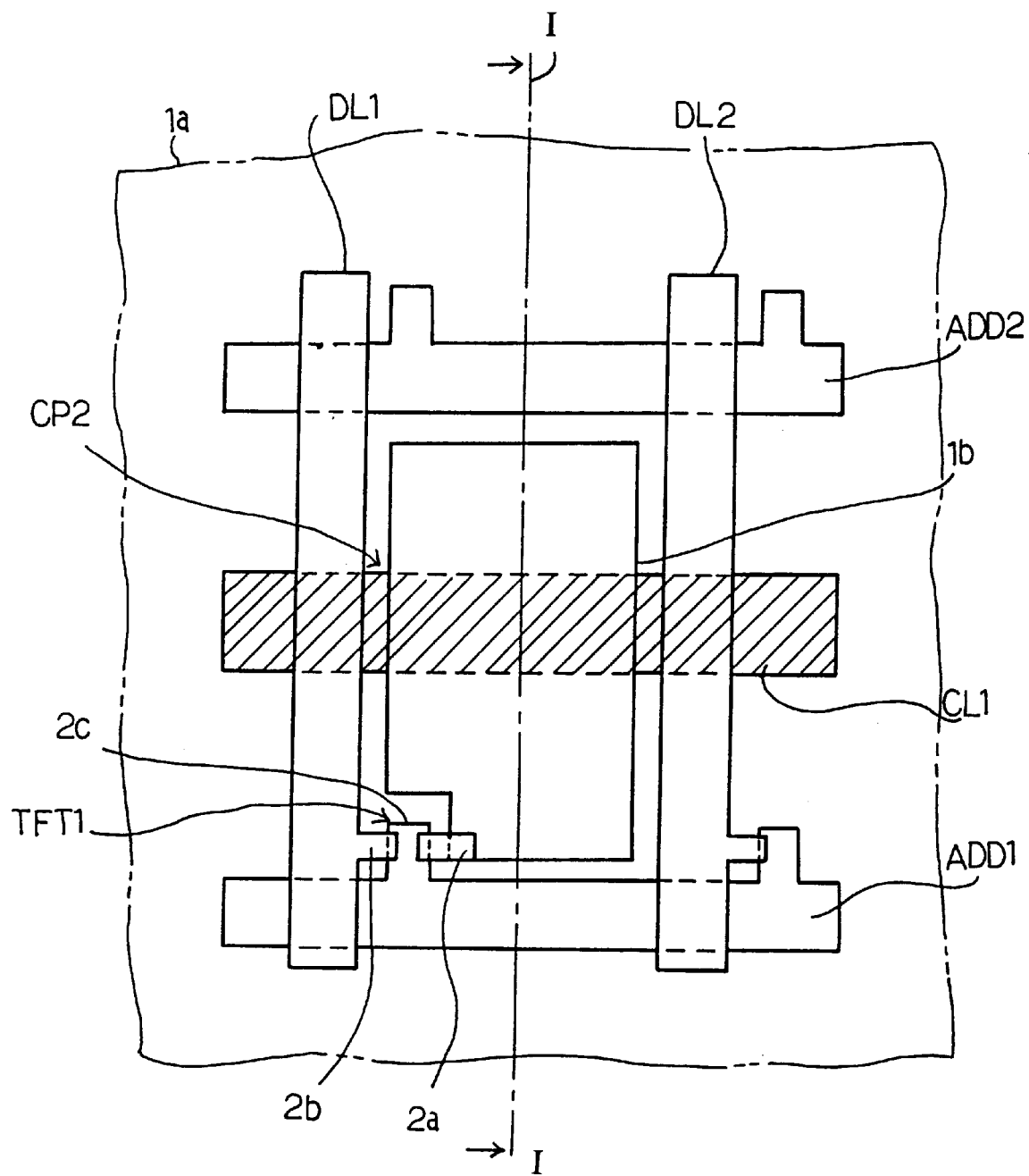
FIG. 2 is a plan view showing the layout of the prior art pixel.
Figure 4:
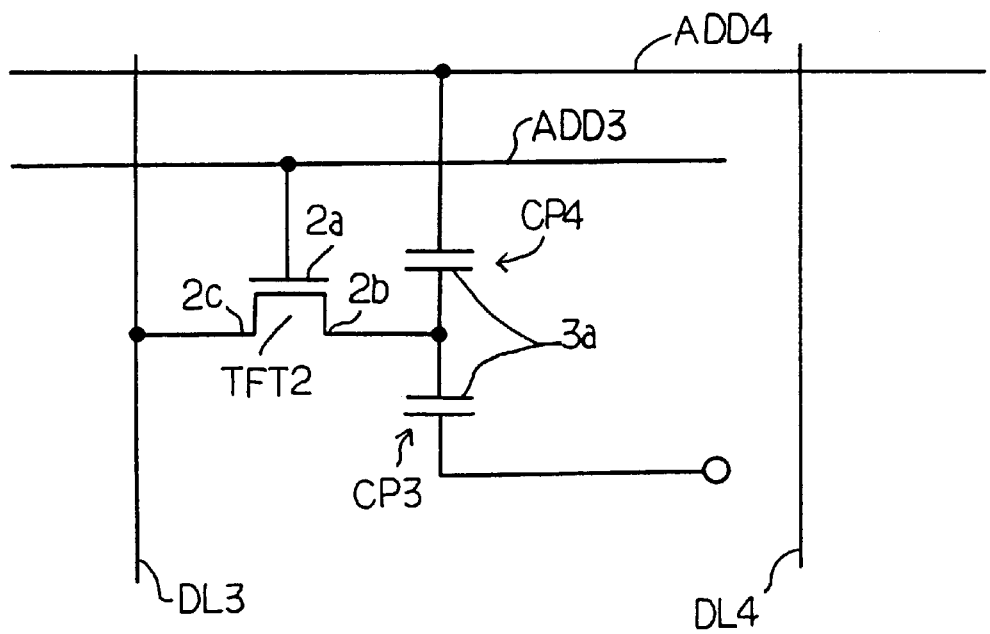
FIG. 4 is a circuit diagram showing the equivalent circuit of the prior art pixel disclosed in Japanese Patent Publication of Unexamined Application No. 59-16685.
Figure 6:
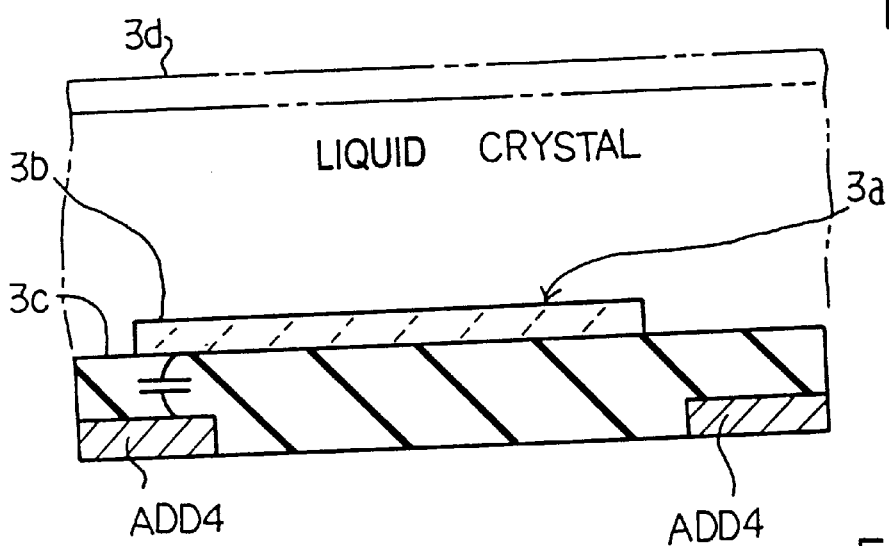
FIG. 6 is a cross sectional view taken along line II—II and showing the structure of the thin film transistor and the pixel electrode incorporated in the prior art pixel.
Figure 5:
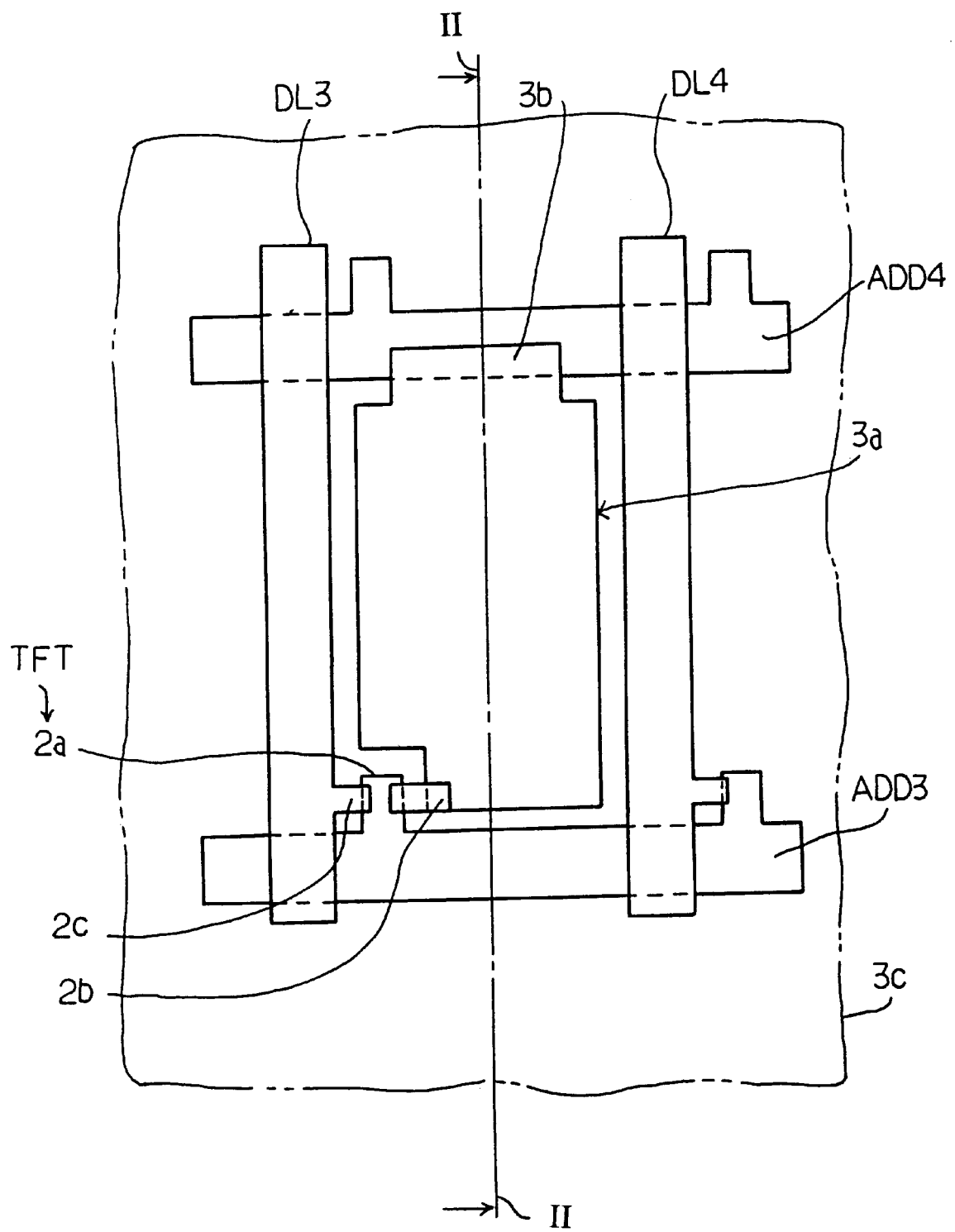
FIG. 5 is a plan view showing the layout of the prior art pixel.
Figure 7:
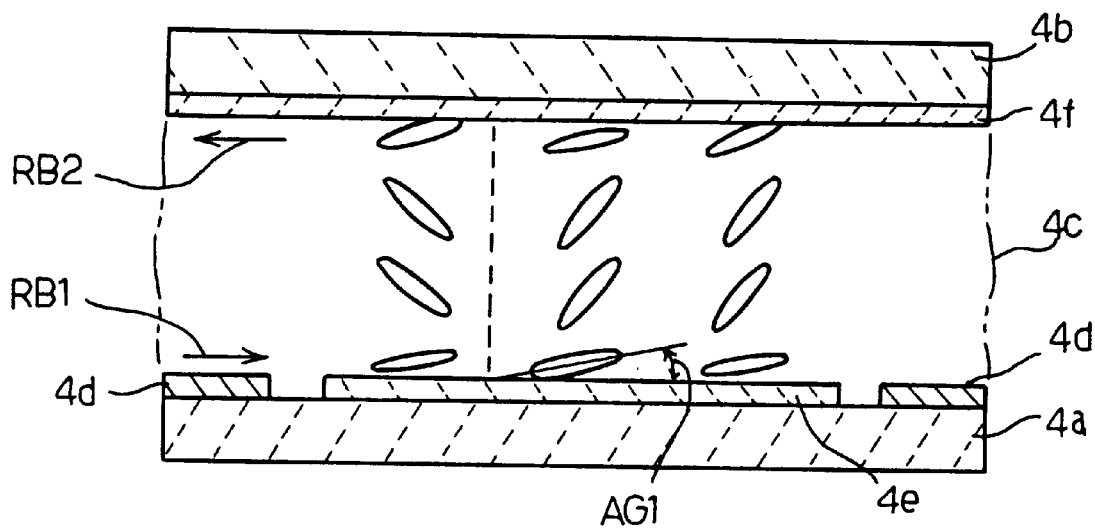
FIG. 7 is a cross sectional view showing the pixel of the prior art twisted nematic liquid crystal display unit.
Figure 8:
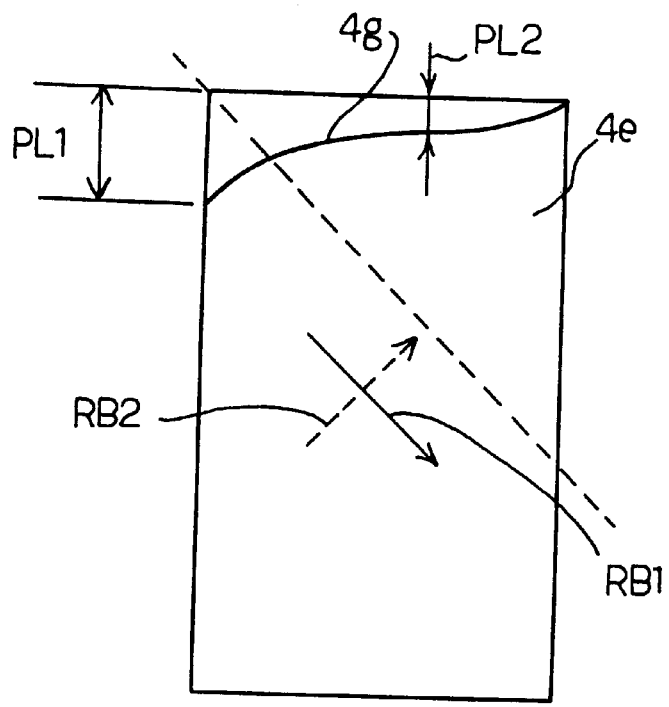
FIG. 8 is a plan view showing the disclination line produced in the pixel.
Figure 9:
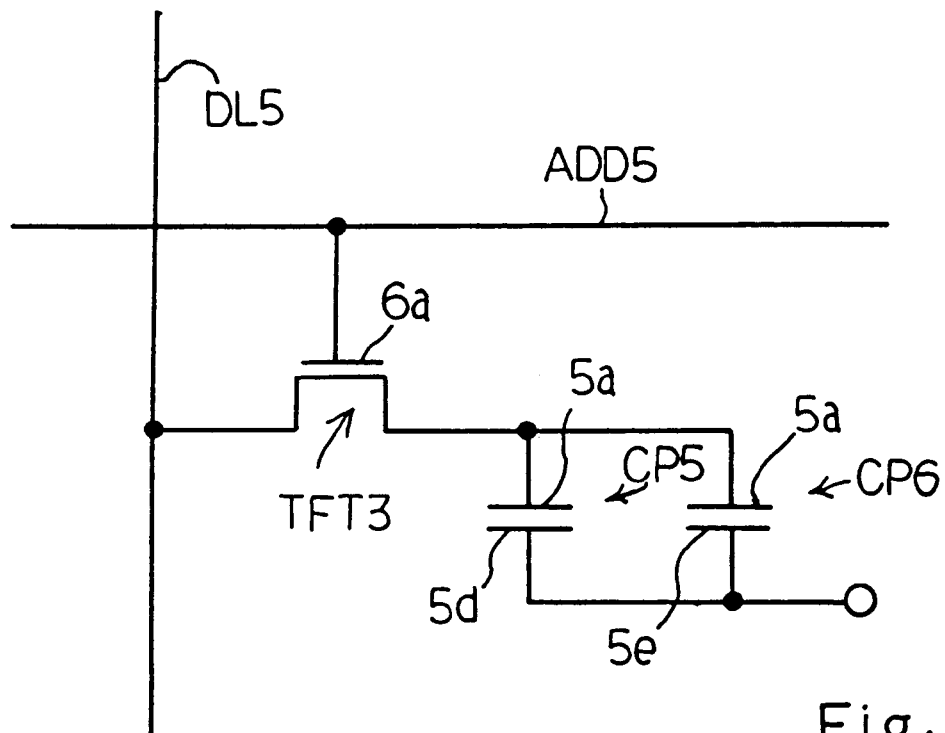
FIG. 9 is a circuit diagram showing the equivalent circuit of the prior art pixel disclosed in Japanese Patent Publication of Unexamined Application No. 4-51121.
Figure 11:
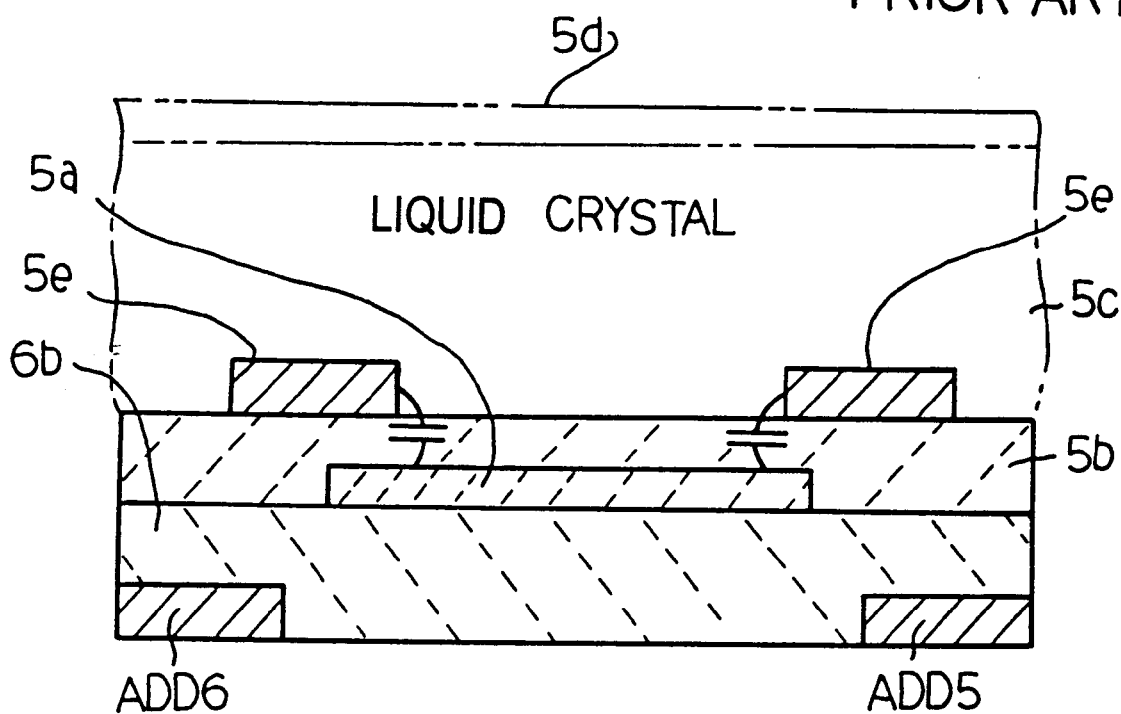
FIG. 11 is a cross sectional view taken along line III—III and showing the structure of the thin film transistor, the storage line and the pixel electrode incorporated in the prior art pixel.
Figure 10:
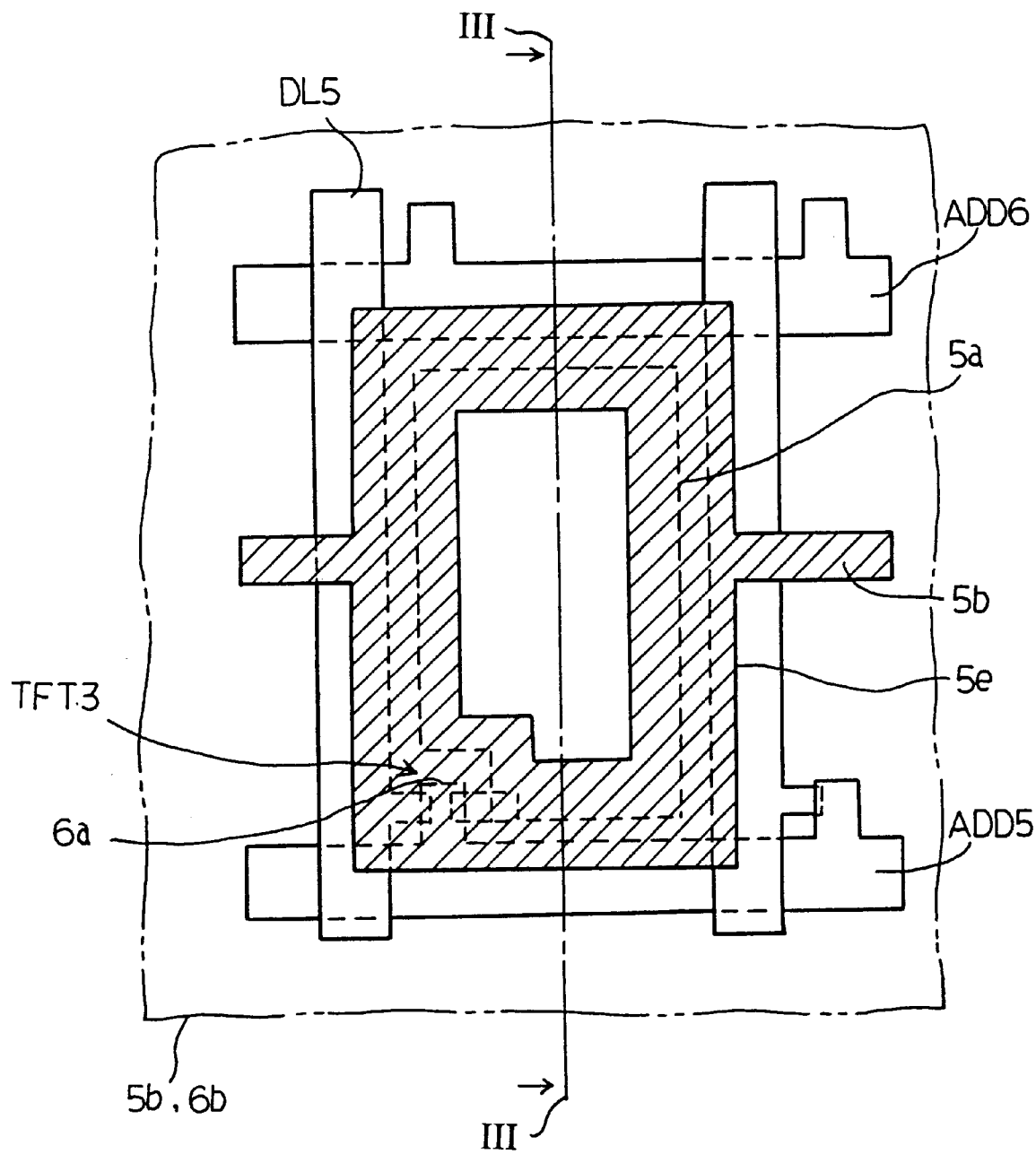
FIG. 10 is a plan view showing the layout of the prior art pixel.
Figure 12:
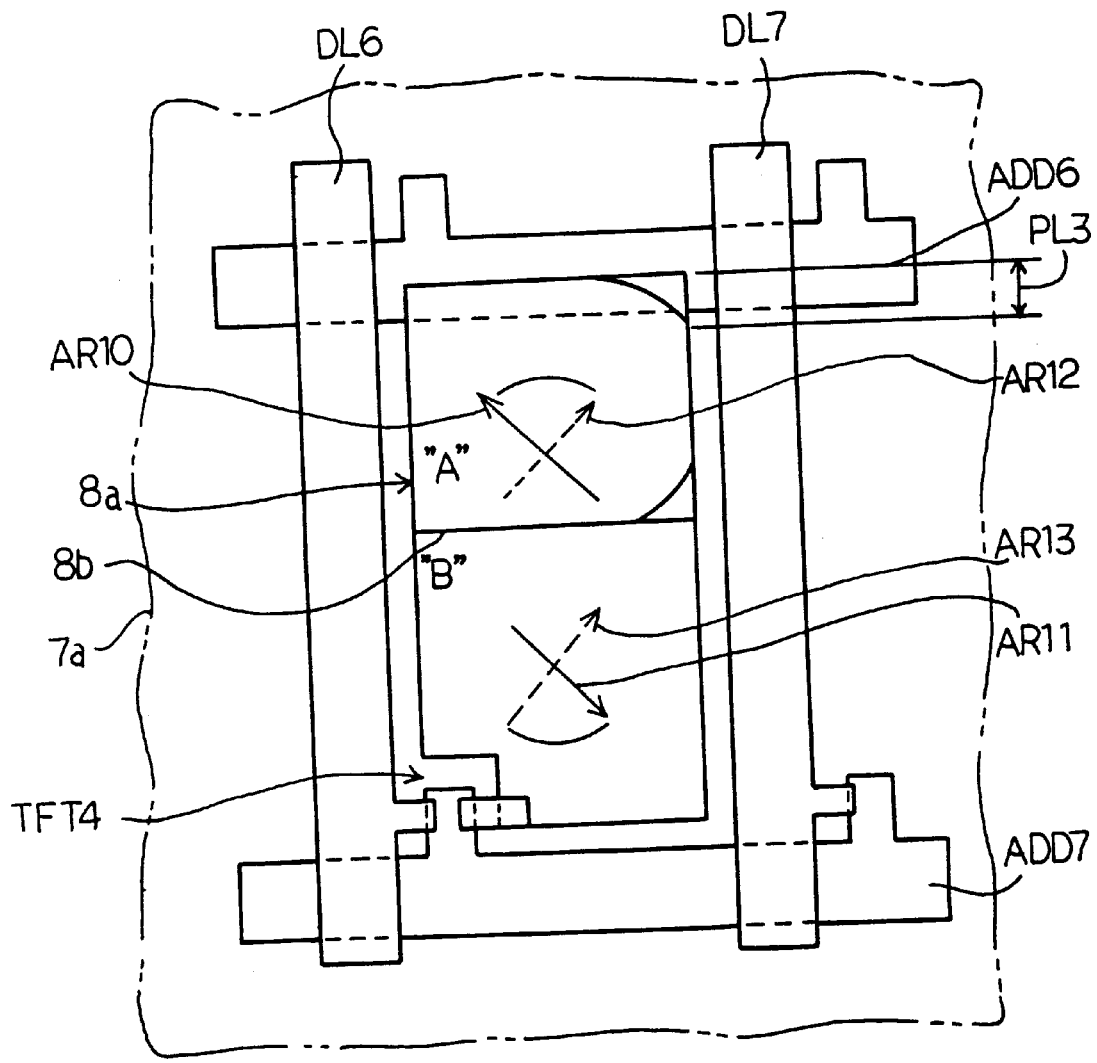
FIG. 12 is a plan view showing the pixel electrode of the prior art multi-domain liquid crystal pixel.
Figure 13A:
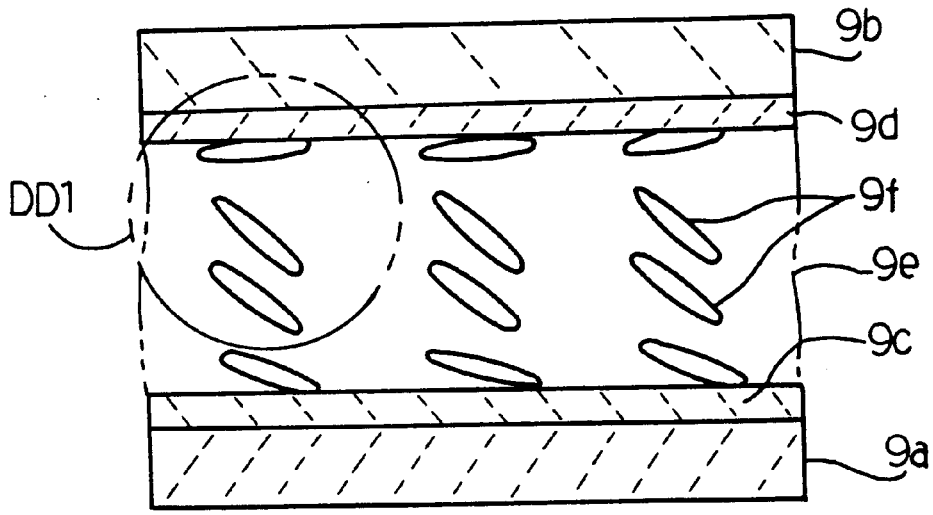
FIGS. 13A and 13B are cross sectional views showing the liquid crystal molecules in the areas of the pixel electrode differently rubbed.
Figure 13B:
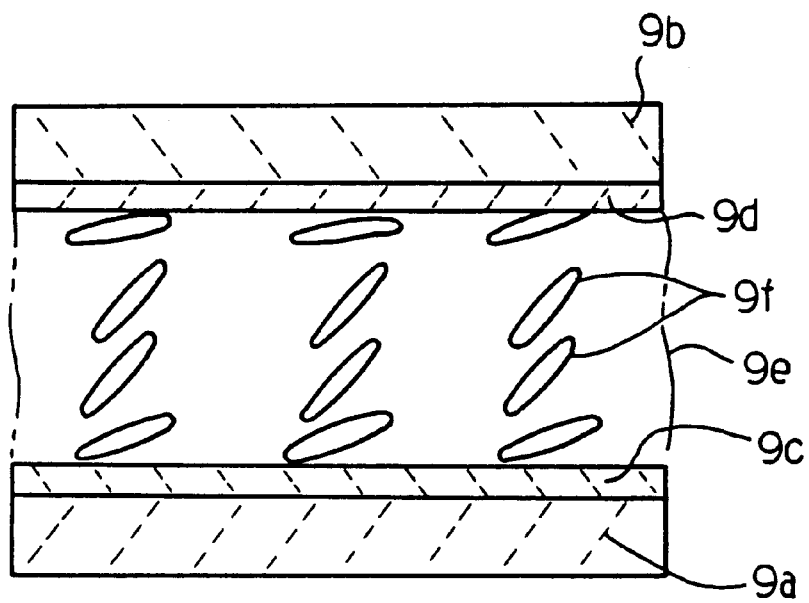

While the liquid crystal capacitor CP10 is keeping the image signal, a disclination line takes place, and is curved along the end line of the pixel electrode 10f over the gate line ADD10. In other words, the disclination line is gradually spaced from the end line as similar to the disclination line 4g (see FIG. 8). However, the end line of the pixel electrode 10f is bent at L2 from the right side. For this reason, the disclination line remains over the gate line ADD10. The gate lines ADD10 to ADD12 shield the back light, and the disclination line is not recognized on the screen.

Thus, the manufacturer does not need to increase the area of a black matrix (not shown), and the narrow black matrix improves the brightness without a strong black light source. Moreover, the narrow block matrix improves the viewing angle.

Second Embodiment

Figure 18:
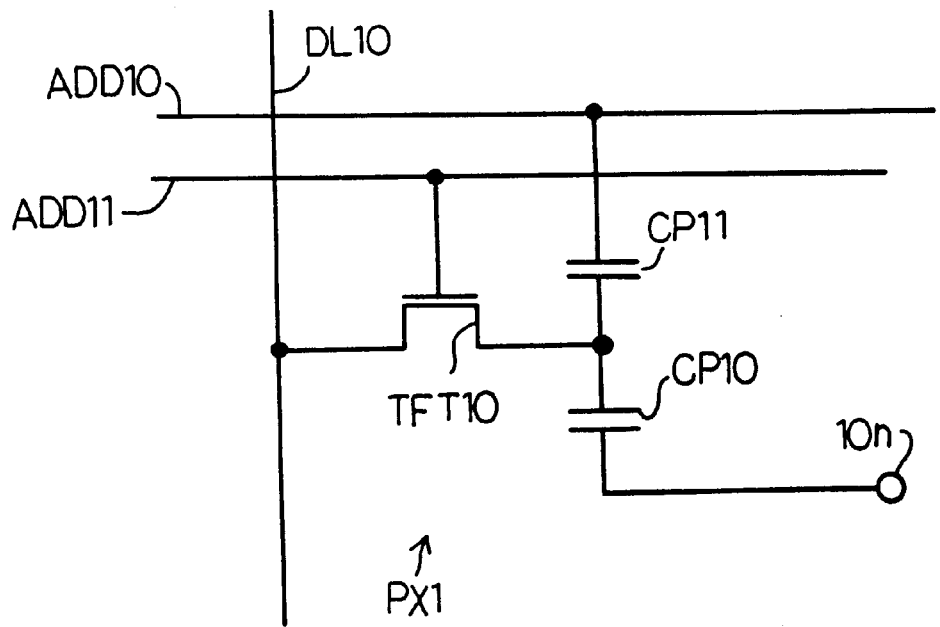
FIG. 18 is a circuit diagram showing an equivalent circuit of another liquid crystal pixel according to the present invention.
Figure 20:
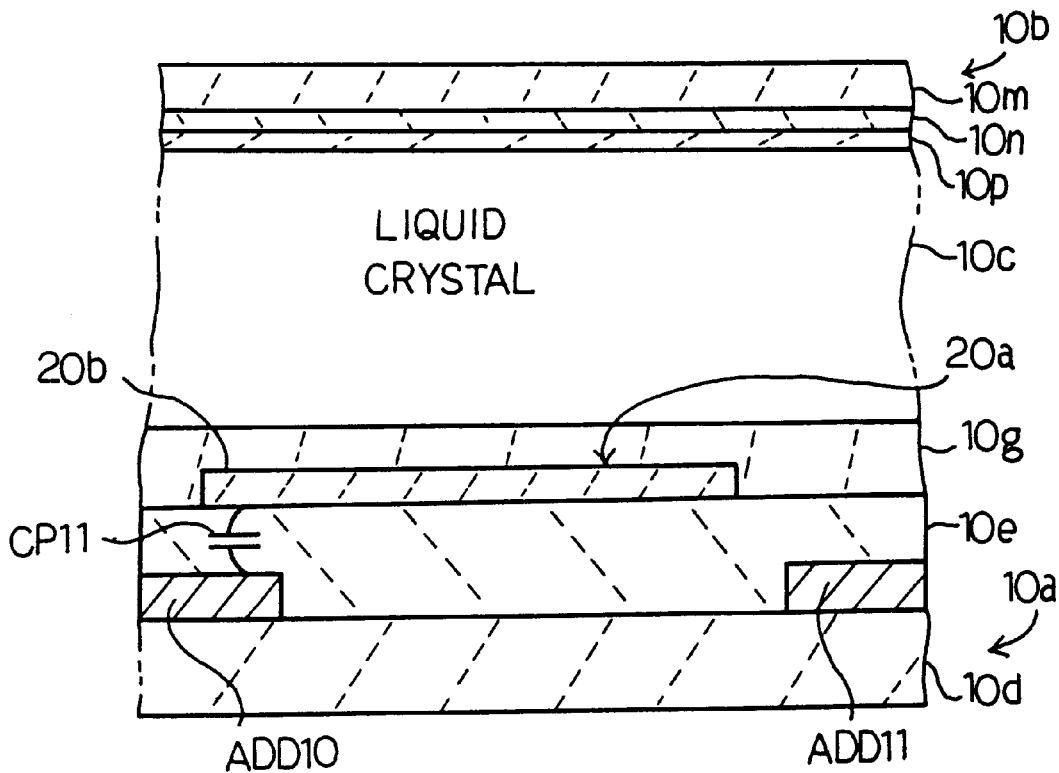
FIG. 20 is a cross sectional view taken along line V—V of FIG. 19 and showing the structure of the liquid crystal pixel.
Figure 19:
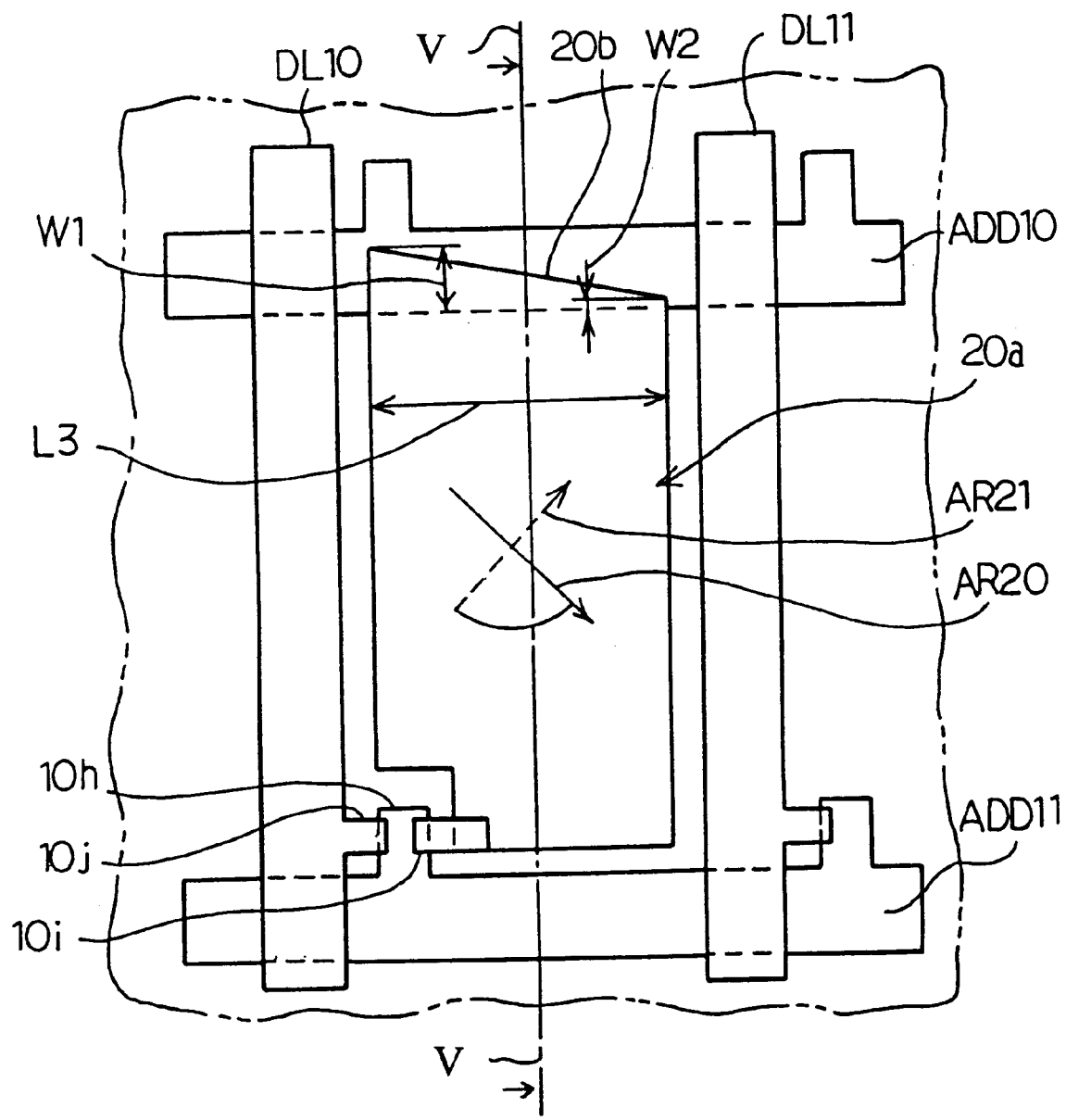
FIG. 19 is a plan view showing the layout of the liquid crystal pixel.

FIGS. 18, 19 and 20 illustrate another pixel incorporated in an active matrix liquid crystal display unit embodying the present invention. As shown in FIG. 18, the equivalent circuit of the second embodiment is similar to the first embodiment, and only a pixel electrode 20a is different from that of the first embodiment. For this reason, the other component layers, lines and electrode are labeled with the same references designating corresponding layers, lines and electrode without detailed description.

The pixel electrode 20a has an end portion 20b, and the end portion 20b linearly increases the width from W2 to W1 along the gate line ADD10. When the pre-tilt angle is 3 degrees, the minimum width W2 is equal to or greater than 4 microns, and the maximum width W1 is equal to or greater than 10 microns. If the pre-tilt angle is greater than 3 degrees, the minimum widths W1 and W2 are decreased. The overlapped area between the end portion 20b and the gate line ADD10, i.e., (W1+W2)L3/2 gives the predetermined capacitance to the accumulating capacitor CP11. In this instance, it is possible for the pixel electrode 20a to have W1 larger than that of the pixel electrode 10f, and the disclination line do not enters into the non-overlapped area of the pixel electrode 20a.

Third Embodiment

Figure 21:
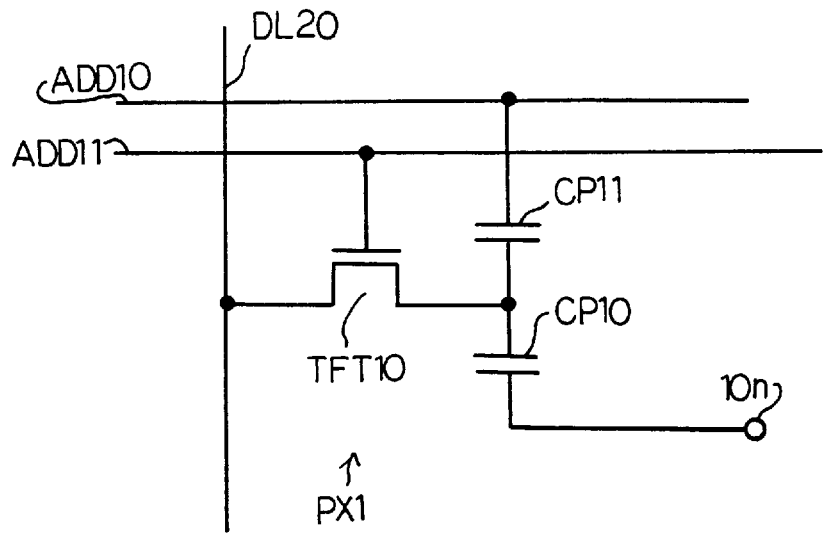
FIG. 21 is a circuit diagram showing an equivalent circuit of yet another liquid crystal pixel according to the present invention.
Figure 23:
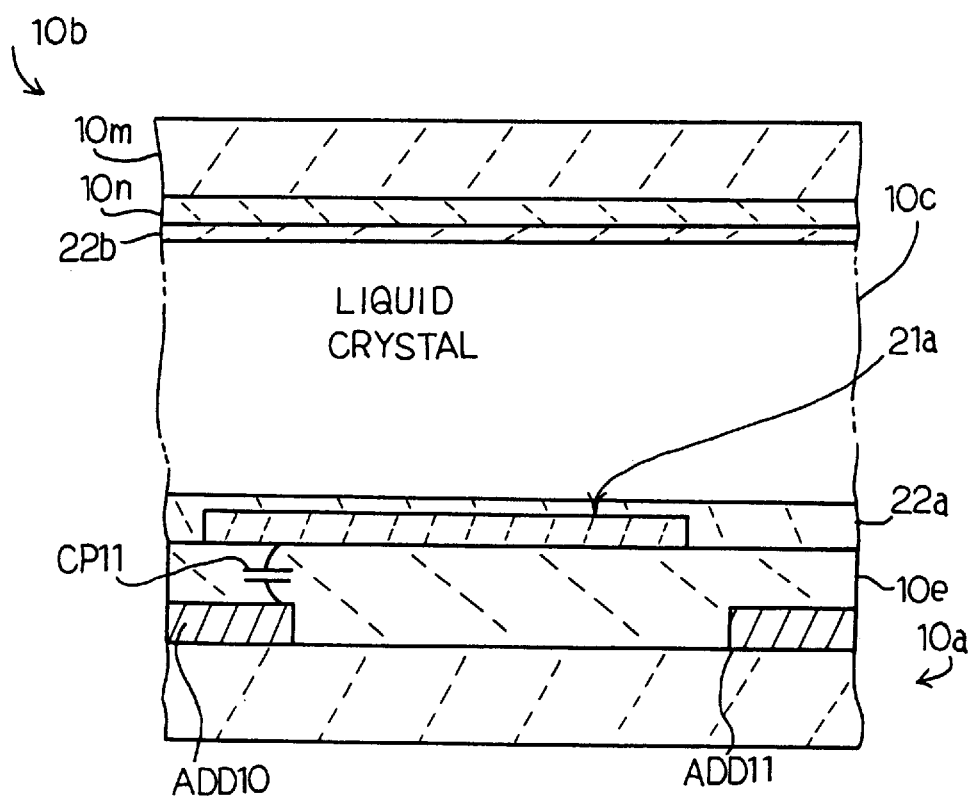
FIG. 23 is a cross sectional view taken along line VI—VI of FIG. 22 and showing the structure of the liquid crystal pixel.
Figure 22:
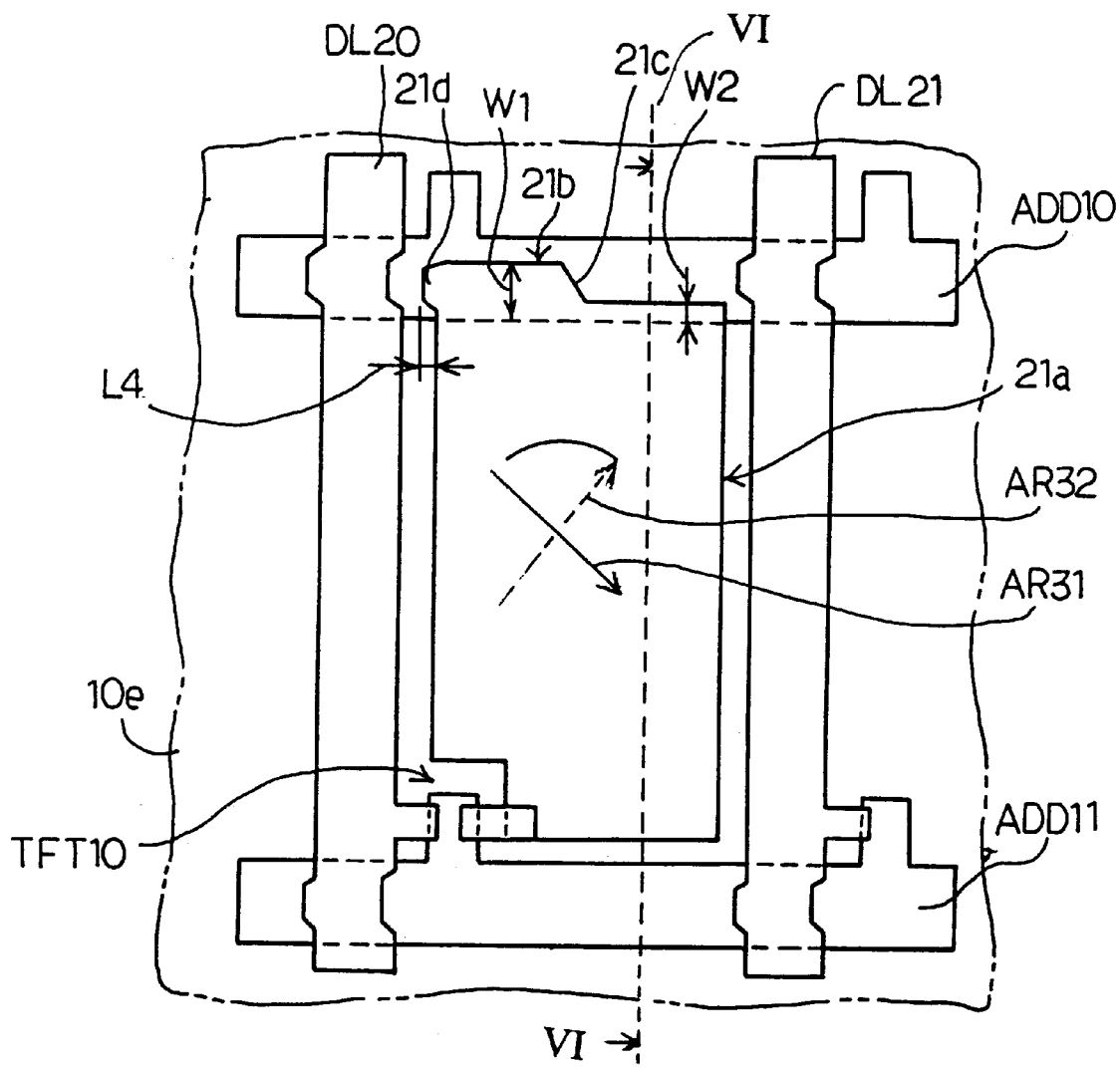
FIG. 22 is a plan view showing the layout of the liquid crystal pixel.

FIGS. 21 to 22 illustrate yet another pixel incorporated in an active matrix liquid crystal display unit embodying the present invention. As shown in FIG. 21, the equivalent circuit of the third embodiment is similar to the first embodiment, and only a pixel electrode 21a, orientation layers 22a/22b and data lines DL20/Dl21 are different from that of the first embodiment. For this reason, the other component layers, lines and electrode are labeled with the same references designating corresponding layers, lines and electrode without detailed description.

The orientation layer 22a is rubbed in a direction indicated by arrow AR31, and the orientation layer 22b is rubbed in a direction indicated by arrow AR32. The pixel electrode 21a has an end portion 21b, and the end portion 21b has a step 21c between a narrow sub-portion and a wide sub-portion. The narrow sub-portion has a width W2 equal to the narrow sub-portion of the end portion 10k, and the wide sub-portion has a width W1 equal to the wide sub-portion of the end portion 10k. The end portion 21d projects from the left side by length L4, and, accordingly, the data lines DL20/DL21 are bent. The projection 21d further spaces the corner of the end portion 21b from the non-overlapped portion, and effectively confines a disclination line in the liquid crystal over the gate line ADD10. Thus, the projection 21d cooperates with the wide sub-portion, and the projection 21d and the wide sub-portion prevent the pixel from including the defects caused by the disclination line.

Fourth Embodiment

Figure 24:
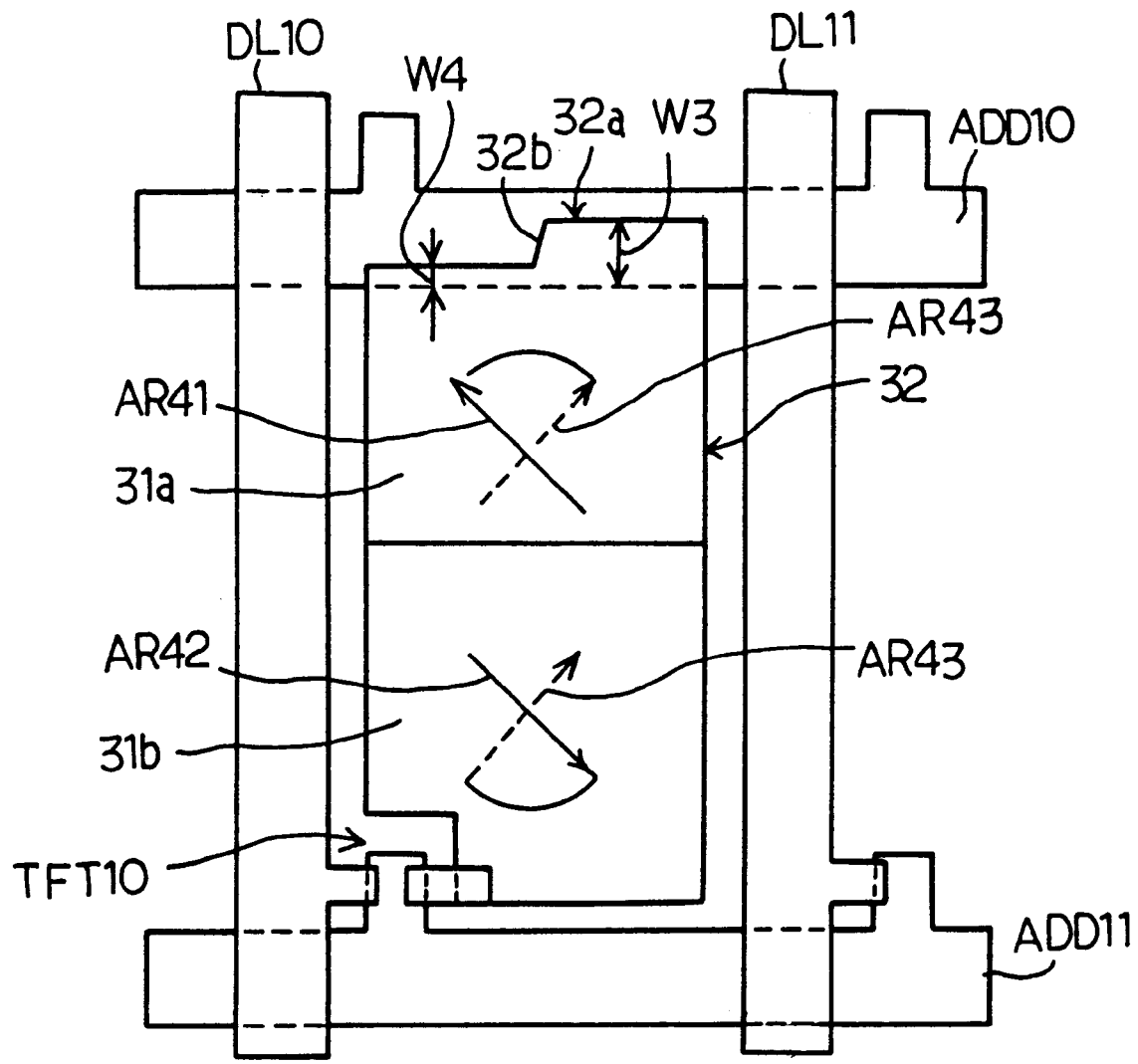
FIG. 24 is a plan view showing the layout around a pixel electrode of a liquid crystal pixel according to the present invention.

FIG. 24 illustrates the layout around a pixel electrode of a multi-domain type pixel incorporated in still another active matrix liquid crystal display unit embodying the present invention. Other component layers, lines and electrode are similar to those of the first embodiment, and description is focused on the multi-domain pixel.

The pixel shown in FIG. 24 has two domains 31a and 31b. The domain 31a has an orientation sub-layer rubbed in a direction of arrow AR41 on a pixel electrode 32, and the domain 31b has a orientation sub-layer rubbed in a direction of arrow AR42 on the pixel electrode 32. The other orientation layer on a counter electrode (not shown) is rubbed in a direction of arrow AR43.

The pixel electrode 32 has an end portion 32a, and a step is formed between a narrow sub-portion and a wide sub-portion. The narrow sub-portion and the wide sub-portion have respective widths W4 and W3, and are adjusted to appropriate values as similar to the first embodiment. If the pre-tilt angle is regulated to 3 degrees, the width W3 is equal to or greater than 10 microns, and the width W4 is equal to or greater than 5 microns. When the pre-tilt angle is increased to 7 degrees, width W3 is equal to or greater than 5 microns, and width W4 is equal to or greater than 4 microns. If the pre-tilt angle exceeds over 7 degrees, the minimum width W3 is less than 5 microns, and the minimum width W4 is less than 4 microns.

The narrow sub-portion and the wide sub-portion are exchanged in the fourth embodiment, because a disclination line is widely spaced from the end line into the domain 31a due to the spray orientation.

The pixel achieves all the advantages of the first embodiment.

Fifth Embodiment

Figure 25:
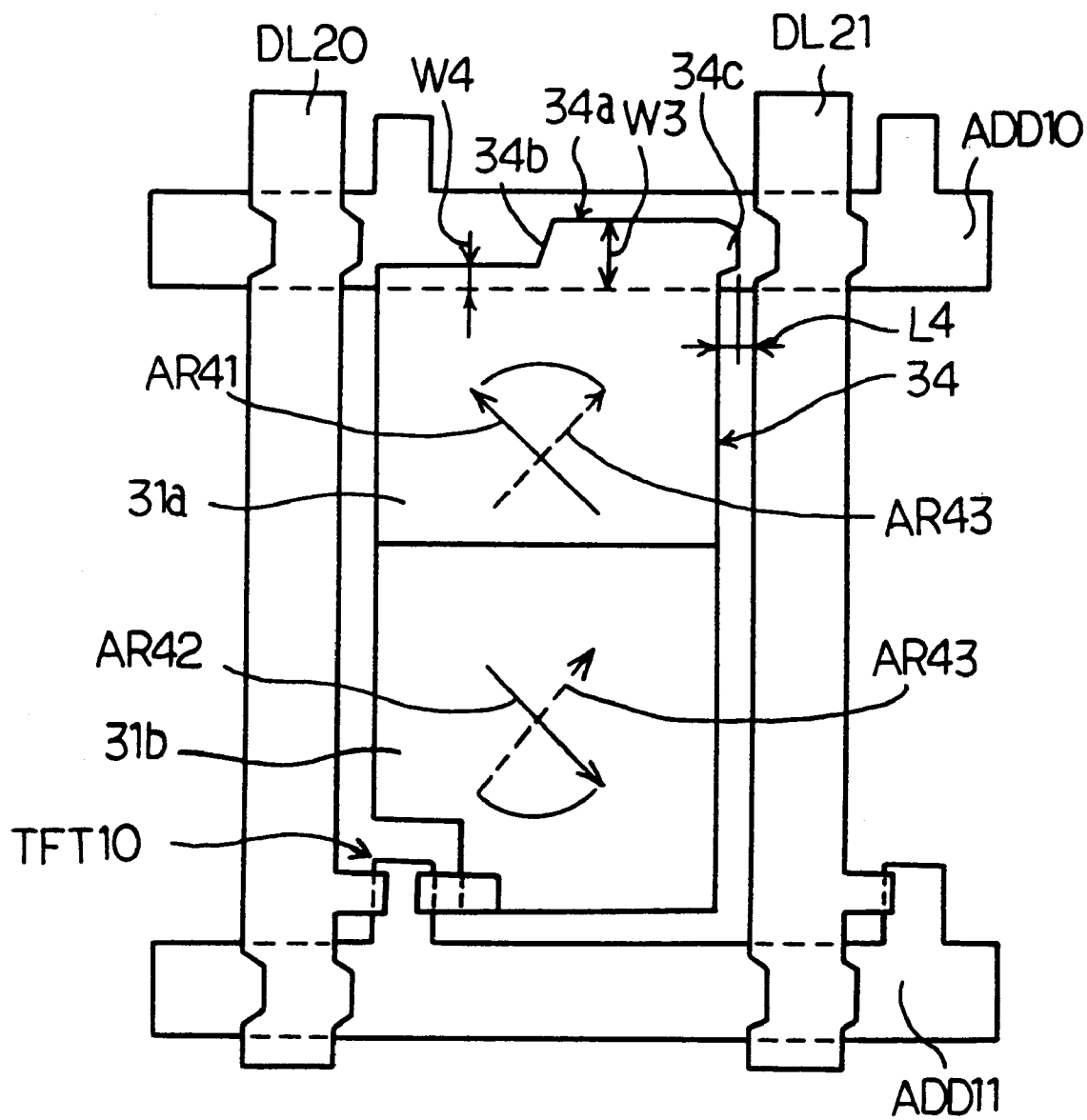
FIG. 25 is a plan view showing the layout around a pixel electrode of a liquid crystal pixel according to the present invention.

FIG. 25 illustrates another multi-domain pixel incorporated in an active matrix liquid crystal display unit embodying the present invention. The multi-domain pixel shown in FIG. 25 is a compromise between the third embodiment and the fourth embodiment, and a pixel electrode 34 has an end portion 34a. The end portion 34a has a step 34b between a narrow sub-portion and a wide sub-portion and a projection 34c. Widths W3 and W4 of the end portion 34a are equal to those of the end portion 32a, and length L4 of the projection 34c is equal to the length of the projection 21d. The projection 34c widely spaces the right corner of the end portion 34a from the non-overlapped area of the pixel electrode 34, and effectively confines a disclination line in the liquid crystal over the gate line ADD10.

Although particular embodiments of the present invention have been shown and described, it will be obvious to those skilled in the art that various changes and modifications may be made without departing from the spirit and scope of the present invention.

What is claimed is:

1. An active matrix liquid crystal display unit comprising:
   a first substrate structure including:
   at least two non-transparent gate lines spaced from each other,
   an insulating layer covering said at least two gate lines,
   a transparent pixel electrode electrically isolated from said at least two gate lines by means of said insulating layer, said pixel electrode being connectable to said at least one data line, having an end portion forming an accumulating capacitor together with said insulating layer and a part of one of said at least two gate lines, said end portion having a width varied along said one of said at least two gate lines,
   a switching transistor connected between said at least one data line and said transparent pixel electrode and gated by the other of said at least two gate lines, and
   a first transparent orientation layer covering at least said transparent pixel electrode and having first rubbing lines directed to a first direction;
   a second substrate structure including:
   a transparent counter electrode opposed to said transparent pixel electrode, and
   a second transparent orientation layer covering at least said counter electrode and having second rubbing lines directed to a second direction different from said first direction; and
   a liquid crystal layer disposed between said first substrate structure and said second substrate structure,
   wherein said width of said end portion of said pixel electrode is linearly increased from one of two side lines of said pixel electrode to the other of said two side lines.

2. The active matrix liquid crystal display unit as set forth in claim 1, in which a single domain pixel is formed between said pixel electrode and said counter electrode, and said width is maximized at a first corner of said end portion and minimized at a second corner of said end portion opposite to said first corner,
   said first rubbing lines being in parallel to a virtual line obliquely drawn from said first corner toward a virtual line between said two side lines.

3. The active matrix liquid crystal display unit as set forth in claim 2, in which the liquid crystal molecules of said liquid crystal layer in the vicinity of said first transparent orientation layer are pre-tilted at a predetermined equal to or greater than 3 degrees, the first minimum width at said first corner and the second minimum width at said second corner are equal to or less than 10 microns and equal to or less than 4 microns, respectively.

4. An active matrix liquid crystal display unit comprising:
   a first substrate structure including:
   at least two non-transparent gate lines spaced from each other,
   an insulating layer covering said at least two gate lines,
   at least one data line electrically isolated from said at least two gate lines,
   a transparent pixel electrode electrically isolated from said at least two gate lines by means of said insulating layer, said pixel electrode being connectable to said at least on data line, having an end portion integral with the pixel electrode, said end portion forming an accumulating capacitor together with said insulating layer and a part of one said at least two gate lines as a capacitive gate line, said end portion having a width varied along said capacative gate line has a longitudinal edge that overlaps said pixel electrode to define a virtual line,
   a switching transistor connected between said at least one data line and said transparent pixel electrode and gated by the other of said at least two gate lines, and
   a first transparent orientation layer covering at least said transparent pixel electrode and having first rubbing lines directed to a first direction;
   a second substrate structure including:
   a transparent counter electrode opposed to said transparent pixel electrode, and
   a second transparent orientation layer covering at least said counter electrode and having second rubbing lines directed to a second direction different from said first direction; and
   a liquid crystal layer disposed between said first substrate structure and said second substrate structure, and
   wherein said width of said end portion of said pixel electrode is linearly increased from one of two side lines of said pixel electrode to the other of said side lines.

* * * * *